United States Patent

Raimondi

[15] 3,680,932
[45] Aug. 1, 1972

[54] STABLE JOURNAL BEARING
[72] Inventor: Albert A. Raimondi, Monroeville, Pa.
[73] Assignee: Westinghouse Electric Corporation, Pittsburgh, Pa.
[22] Filed: Sept. 10, 1970
[21] Appl. No.: 71,006

[52] U.S. Cl. .................................. 308/121
[51] Int. Cl. .............................. E16c 17/00
[58] Field of Search ............... 308/9 A, 73, 121

[56] References Cited

UNITED STATES PATENTS

| 3,232,680 | 2/1966 | Clark | 308/DIG. 1 |
| 3,247,080 | 4/1966 | Blumenfeld et al. | 308/9 |

FOREIGN PATENTS OR APPLICATIONS

| 196,181 | 2/1958 | Austria | 308/73 |
| 702,033 | 1/1954 | Great Britain | 308/121 |
| 647,934 | 5/1960 | Italy | 308/121 |
| 1,151,897 | 2/1958 | France | 308/121 |
| 1,275,662 | 10/1961 | France | 308/A |

Primary Examiner—Martin P. Schwadron
Assistant Examiner—Frank Susko
Attorney—A. T. Stratton, F. P. Lyle and F. Cristiano, Jr.

[57] ABSTRACT

The stability and the load capacity of a journal bearing are improved over conventional non-tilting pad hydrodynamic bearings for supporting the rotating shafts of relatively large machines, such as turbines and generators. The present bearing is considerably cheaper and easier to manufacture than tilting pad journal bearings. The bearing comprises a plurality of tapered segments or lobes which are separated by axial grooves in its inner surface.

9 Claims, 21 Drawing Figures

STABLE JOURNAL BEARING

BACKGROUND OF THE INVENTION

This invention relates generally to journal bearings and, more particularly, to bearings of a hydrodynamic type suitable for supporting the rotating shafts of relatively large machines, such as turbines and generators.

In a bearing configuration heretofore utilized in apparatus, particularly steam turbines and generators, the load carrying arc (bottom half) is about 160° in extent. The top half is relieved, that is, a generally crescent-shaped space is provided between the journal or shaft and the inner surface of the bearing. These bearings have frequently developed a self-excited instability, or vibration, known as oil whip. It can be shown theoretically that a stability threshold, which is a function of size as well as other factors, exists beyond which the bearing is prone to instability. As turbines and generators become larger, the bearings increase in size (diameter), so that the upper limit of stability, which is not known exactly, is frequently exceeded. The problem becomes more acute as the size increases. A change in the bearing configuration to improve the stability characteristic is required. This invention provides a bearing configuration which has greatly improved stability characteristics and other advantages hereinafter discussed.

BRIEF SUMMARY OF THE INVENTION

In accordance with one embodiment of the invention, a journal bearing comprises a plurality of segments or lobes each of which has a circumferentially extending arcuately tapered recess in its inner surface. The lobes are separated by axial grooves in the inner surface of the bearing. Lubricating oil is supplied to each of these grooves from which it enters the deepest part of the recessed portion of the adjacent lobe at its leading edge with respect to rotation of the shaft. For applications where the direction of the load vector is downward, the bottom lobe extends through a relatively long arc, for example about 180°. One or more lobes, preferably two, are provided in the top half of the bearing. The purpose of these lobes is to promote the formation of positive oil film pressures rather than negative pressures, thereby minimizing suction forces which tend to cause oil whip, and also to exert positive radial forces which stabilize the journal, that is, tend to move it back to its equilibrium position, against vibrations which may be either self-excited (oil whip) or forced (imbalance, steam whip, etc.). The recessed lobes break up oil film forces and cause dynamic forces to be in phase with displacement forces. The maximum stabilizing effects occur when the lobes in the top half extend axially almost the full length of the bearing.

BRIEF DESCRIPTION OF THE DRAWINGS

For a better understanding of the nature of the invention, reference may be had to the following detailed description, taken in conjunction with the accompanying drawings, in which.

DESCRIPTION OF PREFERRED EMBODIMENTS

Figure 1:
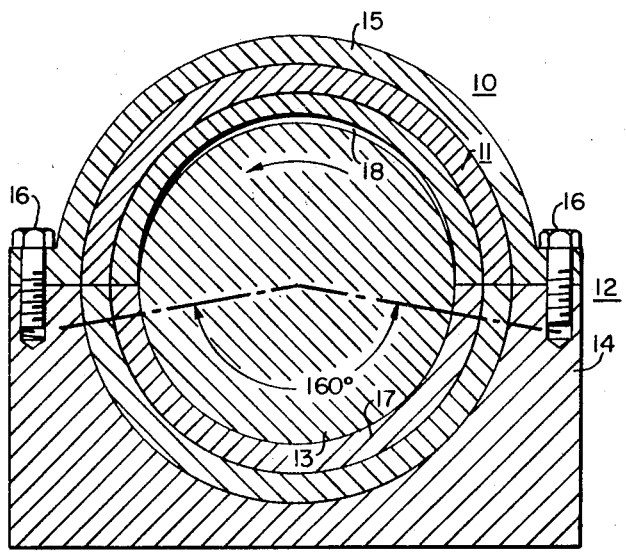
FIG. 1 is a view, in transverse vertical section, of a journal bearing and housing constructed in accordance with the prior art.

In FIG. 1 of the drawing there is shown a bearing structure 10 previously utilized in apparatus, such as turbines and generators. The bearing structure 10 comprises a journal bearing member or shell 11 mounted in a housing 12 for rotatably supporting a rotatable shaft or journal 13. The housing 12 includes a base 14 and a cap 15 attached to the base 14 by bolts 16. The journal bearing 11 is lined with a liner 17 composed of a suitable material, such as babbitt. As shown, the load carrying arc (bottom half) is about 160° in extent. The top half is relieved, that is a large generally crescent-shaped space 18 is provided between the journal or shaft 13 and the inner surface of the bearing. As explained hereinbefore, bearings of the foregoing type have frequently exhibited a self-excited instability, or vibration, known as oil whip.

Figure 2:
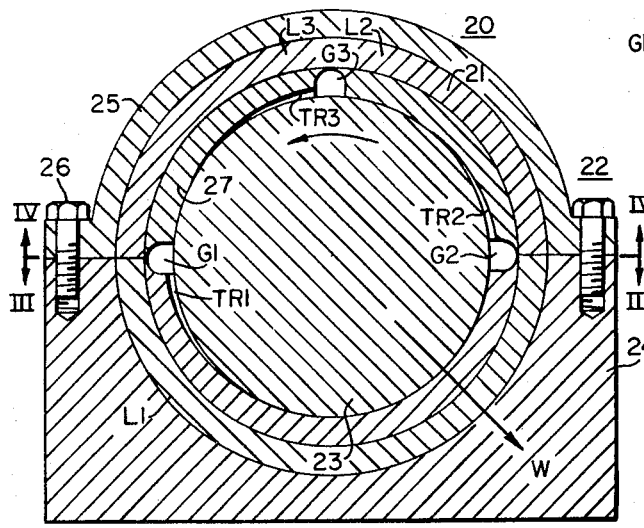
FIG. 2 is a view, in transverse vertical section, of a journal bearing and housing, embodying principal features of the present invention.

As shown in FIG. 2, in order to improve the stability characteristic of bearings of the hydrodynamic type, a bearing structure 20 having a journal bearing member or shell 21 therein is provided. The journal bearing member 21 is mounted in a housing 22 which includes a base 24 and a cap 25 attached to the base by bolts 26. A shaft 23 is rotatably mounted in the journal bearing 21. As shown, the bearing member 21 has a liner 27 composed of a suitable material, such as babbitt.

Figure 3:
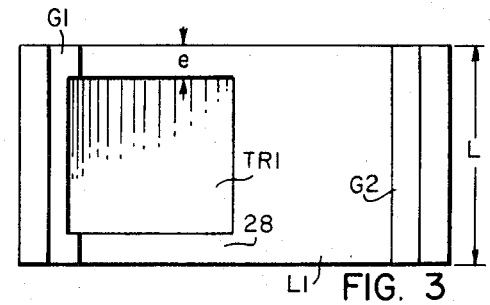
FIGS. 3 and 4 are views, in plan, looking in the direction of the lines III—III and IV—IV, respectively, in FIG. 1, the housing and the shaft being omitted.
Figure 4:
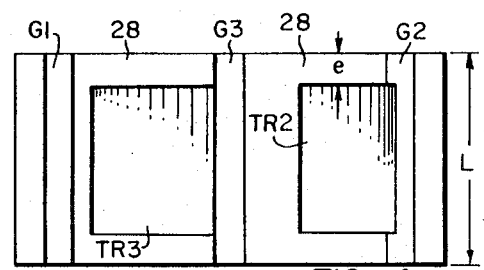

As shown in FIGS. 2, 3 and 4 the journal bearing 21 comprises a plurality of segments or lobes L1, L2 and 13. Each lobe has a circumferentially extending arcuately tapered recess in its inner surface. Thus, the lobe L1 has a recess TR1 therein, the lobe L2 has a recess TR2 therein and the lobe L3 has a recess TR3 therein. The lobes L1, L2 and L3 are defined or separated by axial grooves G1, G2 and G3 provided in the inner surface of the bearing 21 to constitute demarcations between lobes. The deepest part of the tapered recessed portion of each lobe communicates with the adjacent groove at the leading edge of the lobe with respect to the direction of rotation of the shaft 23. Thus, the deepest part of the tapered recess TR1 communicates with the groove G1, the deepest part of the tapered recess TR2 communicates with the groove G2 and the deepest part of the tapered recess TR3 communicates with the groove G3. For clarity of illustration, the depth of the tapered recesses and the axial grooves shown in the present drawing is greatly exaggerated.

In order to retain oil in the bearing and increase its load capacity, the ends of the tapered recesses may be sealed with circumferentially extending lands 28 of axial length $e$ as shown more clearly in FIGS. 3 and 4. The lands 28 are formed integrally with the bearing 21. The lands utilized in the present bearing are such that $e$ equals 0.1L, where L is the overall axial bearing length. It can be shown that an optimum value of $e$ exists.

Figure 5:
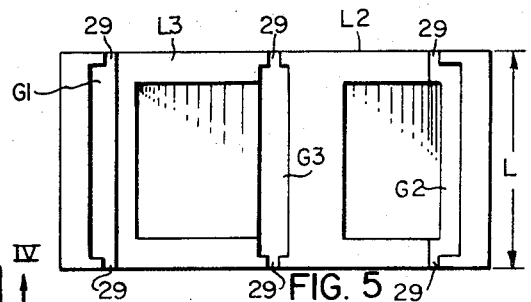
FIG. 5 is a view, similar to FIG. 4, of a first modification of the invention.

As previously explained, the lobes of the bearing are separated by axial grooves which may extend the full length of the bearing as shown in FIGS. 3 and 4. However, the length of the axial grooves may be less than the full length of the bearing as shown in FIG. 5. In this case bleed grooves 29 of a reduced size are provided at the ends of the axial grooves. The size of the bleed grooves and the axial grooves can be varied to change the oil end flow and thereby alter the bearing operating temperature.

Lubricating oil is supplied to each one of the axial grooves. The oil may be supplied by an external pump as in conventional turbine-generator applications, under moderate pressure, or at ambient pressure by utilizing other oil transfer devices such as oil rings, chains, discs, etc. of a type well known in the art.

In applications where the direction of the load vector W is generally downward, as in turbines and generators, the bottom lobe L1 extends through an arc of approximately 180°. Thus, appreciable arc is available for providing for shifts in the position of the load vector W, providing appreciable surface area for distributing the journal load, thereby resulting in low contact pressure while the journal is at rest or operating up to the point of "lift-off" (formation of hydrodynamic oil film), and providing appreciable surface for making grooves for incorporating hydrostatic lifts in applications where they may be required. Optimum performance results when the bearing is oriented in the machine so that the load vector W has the position shown in FIG. 2.

As shown in FIG. 2 the lobes L2 and L3 each extend through an arc of substantially 90°. Thus, the bearing shown in FIG. 2 utilizes two lobes in the top (unloaded) half. More than two lobes or only one lobe may be utilized in the top half of the bearing. The purpose of these lobes is to promote the formation of positive oil film pressures rather than negative pressures, thereby eliminating or minimizing suction forces which tend to cause oil whip, and to exert positive radial forces which stabilize the journal, that is, tend to move it back to its equilibrium position against vibrations which may be either self-excited (oil whip) or forced (imbalance, steam whip, etc.).

Figure 6:
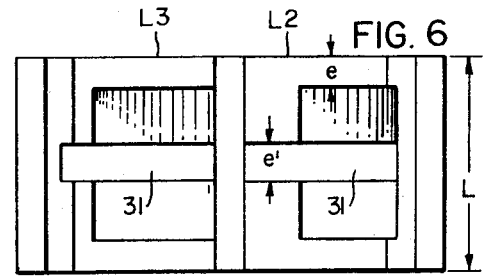
FIG. 6 is a view, similar to FIG. 4, of a second modification of the invention.

The maximum stabilizing effects occur when the lobes in the top half of the bearing extend axially almost the full length (L - $2e$ as in the bearing shown in FIGS. 2, 3 and 4. However, some applications may not require the full stabilizing effects produced by these long lobes. Accordingly, the bearing configuration shown in FIG. 6 may be utilized. In this configuration the lobes in the top half are divided axially by providing a circumferential groove 31 of width $e'$ at the center portion of each of the lobes in the top half of the bearing. While this would tend to reduce the stability properties of the bearing, it would increase oil flow and also lower the friction losses incurred in the top half of the bearing.

Figure 7:
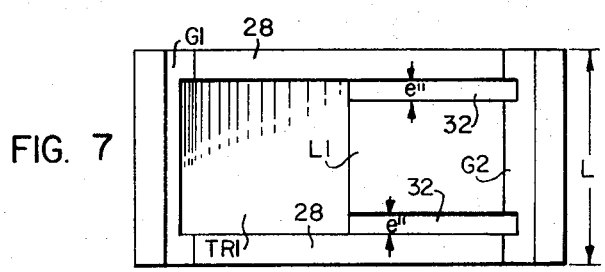
FIG. 7 is a view similar to FIG. 3, of a third modification of the invention.

If further increase in stability is desired, the long lobe L1 of the bearing can be provided with circumferential grooves 32 of width $e''$ as shown in FIG. 7 connecting recess TR1 with groove G2. The grooves 32 could be stopped short of groove G2, or they could be continued backward to recess G1. While these modifications and permutations thereof would increase stability, they would decrease somewhat the minimum film thickness (discussed hereinafter).

An advantage of the bearing shown in FIG. 2, which utilizes three lobes, is that it is relatively easy to make, particularly as the bearing diameter increases, as in the current trend in turbines and generators. In addition, it is considerably less expensive to make than the tilting pad journal bearing which is often utilized in applications to get improved stability.

Figure 8:
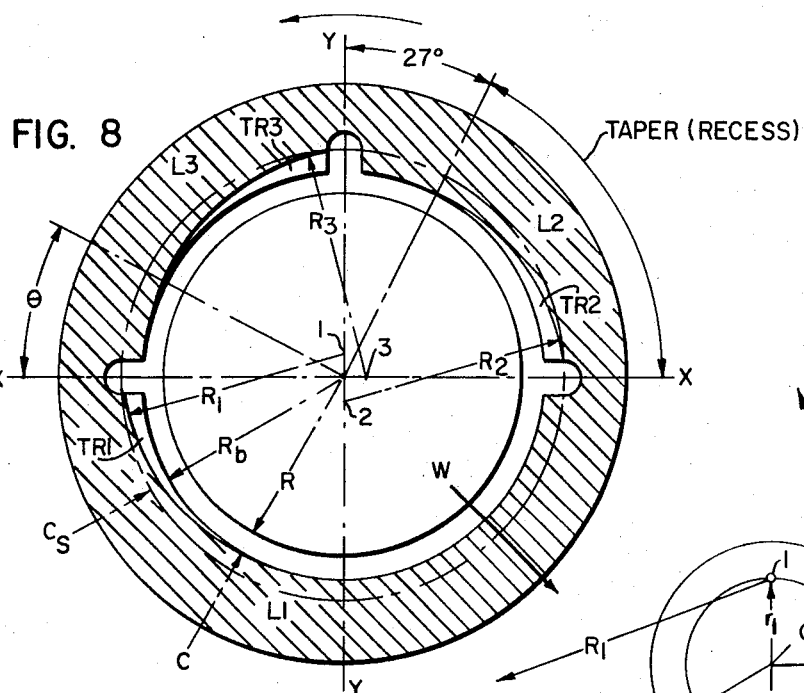
FIG. 8 is a view, similar to FIG. 2, illustrating the manner of constructing a bearing having three lobes.
Figure 9:
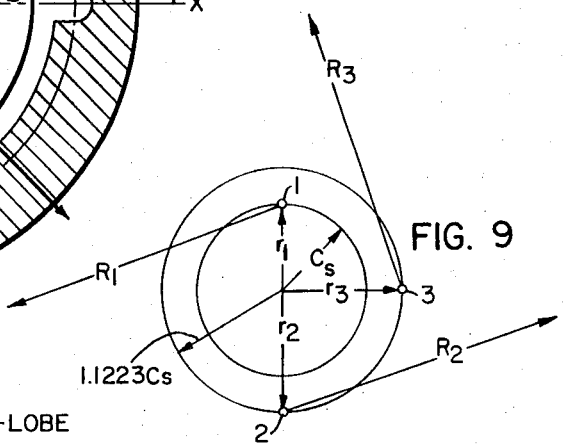
FIG. 9 is an enlarged view of the center of the bearing shown in FIG. 8, further illustrating the manner of constructing the bearing.

The construction of the lobes is shown in FIGS. 8 and 9, in which:

R = radius of journal (shaft)
$R_b$ = radius of bearing, that is, the conventional bearing bore.
C = radial clearance (conventional) = $R_b$ − R.
$C_s$ = "step" distance of lobe (that is, radial distance below bore radius $R_b$ that leading edge of lobe lies). This is a design parameter which is explained more fully hereinafter.

Now, referring to FIG. 8, arcs of equal radius $$R_1 = R_2 = R_3 = (R_b + C_s) \quad (1)$$

are swung from positions 1, 2, 3 to cut respectively the bottom lobe L1, and the two top lobes L2, L3. The radii ($r$) of these positions (1, 2, 3) have been derived analytically and are given by the following equation:

$$r = C_s/\cos\theta \quad (2)$$

In this equation, $\theta$ is an angle which reflects the part of the lobe that is not tapered or recessed, that is, coincides with the conventional bearing bore (radius $R_b$). Theory shows that an optimum value of $\theta$ exists. For the top lobes (L2, L3), the optimum value of $\theta$ is approximately 27°. Hence, from Equation (2) $r_2 = r_3 =$ 1.1223 $C_s$, 1.1223 being the reciprocal of cos 27°, and $r_2$ or $r_3$ being substituted for r. For the bottom lobe (L1) $\theta$ is made equal to 0° in order to provide a 90° extent of lobe which coincides with the bore (radius $R_b$). Hence, $r_1 = C_s$, since cos 0° = 1.

The quantity $C_s$ appearing in equations (1, 2) is an important design parameter. From lubrication theory it can be shown that an optimum value exists. The optimum value lies in the range $$C > C_s > 2C \qquad (3)$$

Equations (1, 2, 3) thus comprise the basic design equations. The design is easily achieved once the journal radius $R$ and the radial clearance $C = R_b - R$ is established, $R_b$ being the conventional bearing bore radius.

As previously explained, the angle $\theta$ for the bottom lobe L1 is made equal to 0°. Hence $r_1 = C_s$. As shown in FIGS. 8 and 9, the positions 1, 2 are located on the vertical centerline Y—Y of the bearing. The position 3 is located on the horizontal centerline X—X of the bearing. As previously stated, $r_1 = C_s$. The tapered recess TR1 in the lobe L1 is cut by swinging an arc having a radius $R_1$ from the position 1. As also previously stated, $r_2 = r_3 = 1.1223\ C_s$. Thus, the tapered recess TR2 for the lobe L2 is cut by swinging an arc having a radius $R_2$ from the position 2. Likewise, the tapered recess TR3 in the lobe L3 is cut by swinging an arc having a radius $R_3$ from the position 3. As previously explained, $R_1 = R_2 = R_3 = (R_b + C_s)$. These quantities are illustrated in FIGS. 8 and 9.

Figure 10:
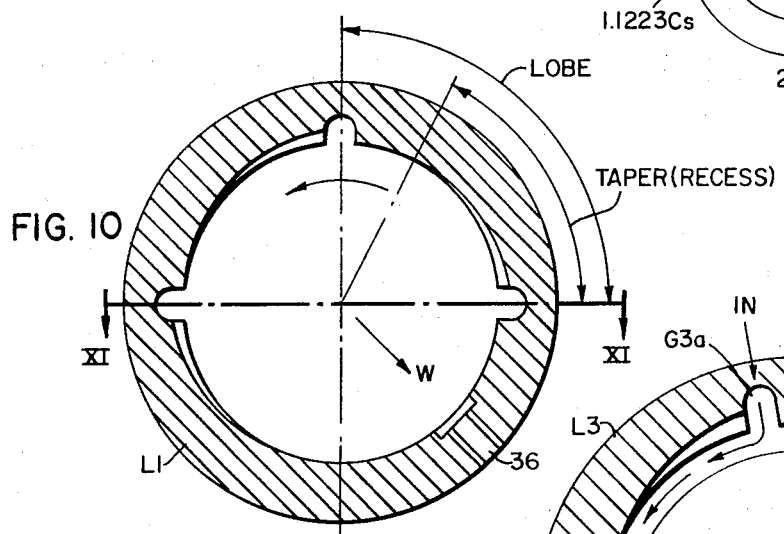
FIG. 10 is a view similar to FIG. 2, showing the manner in which oil may be supplied to the bearing at high pressure for hydrostatic lifting of the shaft supported by the bearing.
Figure 11:
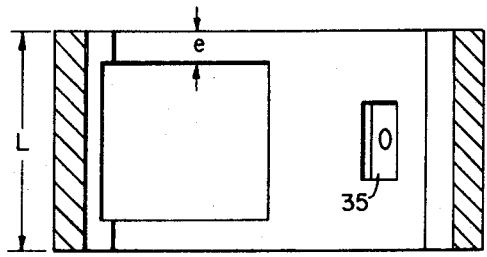
FIG. 11 is a view, in section, taken along the line XI—XI in FIG. 10.

As explained hereinbefore, the bottom lobe L1 has approximately a 90° extent of surface which coincides with the conventional bore of the bearing (radius $R_b$). This provides sufficient surface to make grooves for incorporating hydrostatic lifts in applications where they may be required. This feature is illustrated in FIGS. 10 and 11 in which a groove 35 is provided in the interior surface of the bearing. Oil may be supplied to the grooves 35 through a passageway 36 connected to a suitable supply (not shown) having a relatively high pressure.

Figure 12:
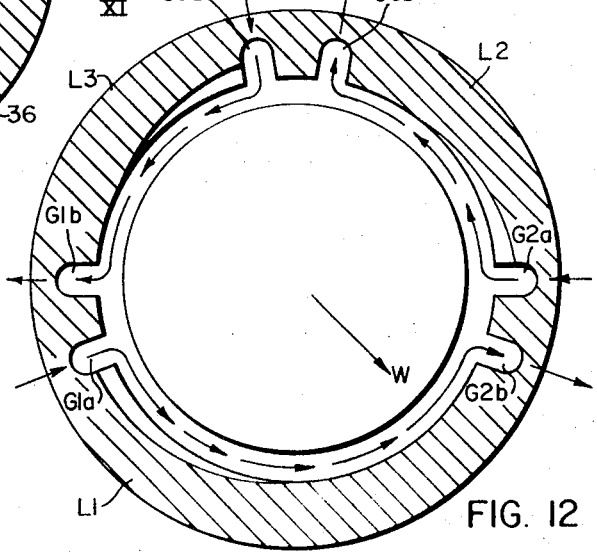
FIG. 12 is a view, similar to FIG. 2, of a fourth modification of the invention.

In the modification of the invention shown in FIG. 12, two adjacent grooves are utilized to separate the lobes L1, L2 and L3. One groove is used to exhaust the hot oil leaving the lobe trailing edge, the other groove is used to inject cold supply oil to the leading edge of the adjacent lobe. Thus, as shown in FIG. 12, oil is injected into grooves G1a, G2a and G3a. Likewise, oil is exhausted from grooves G1b, G2b and G3b. The oil may be supplied from a relatively low pressure pump (not shown). In this manner cooler bearing temperatures can be maintained by providing the additional axial grooves.

Figure 13:
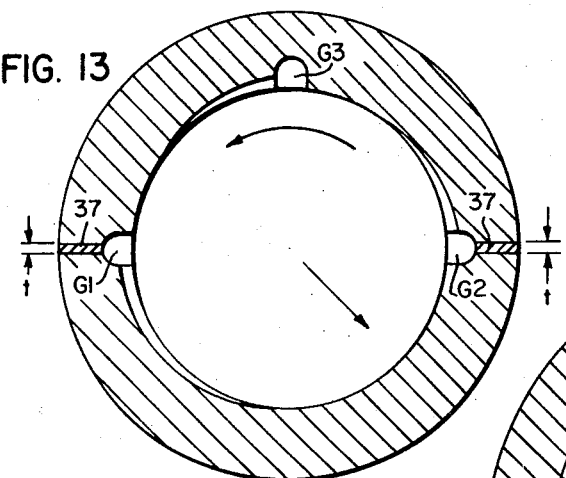
FIG. 13 is a view, similar to FIG. 2, illustrating a manner in which the bearing may be preloaded.

In the illustration shown in FIG. 13, the bearing may be preloaded by machining the bearing with shims 37 inserted in place at the horizontal split of the bearing. The bearing is then assembled for operation without the shims. The shims have a thickness $t$, where $t = \lambda C_s$. The optimum value of the factor $\lambda$ is determined by tests. Preloading the bearing in this manner will further enhance the stability properties of the bearing by causing the oil film pressures to increase, if such improvements are desired.

Figure 14:
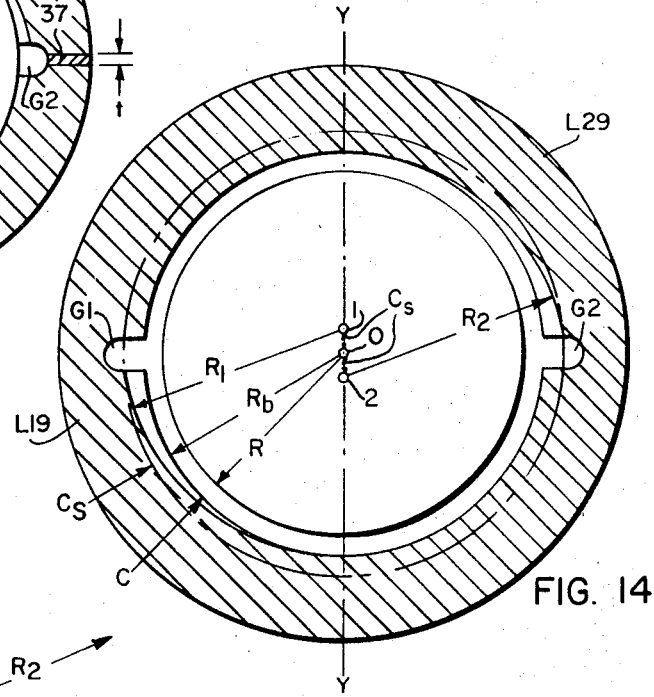
FIGS. 14 and 15 are views, similar to FIGS. 8 and 9, respectively, illustrating the manner of constructing a bearing having two lobes.
Figure 15:
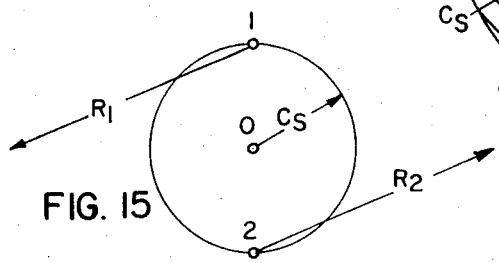

FIGS. 14 and 15 show a two-lobe bearing which is simple to construct. As shown, $R_1 = R_2 = R_b + C_s$. The positions 1, 2 are located on the vertical centerline Y—Y of the bearing at a distance $C_s$ from the center of the bearing, see FIG. 15. Bearings having four or more lobes could be constructed in a similar manner.

Figure 18A:
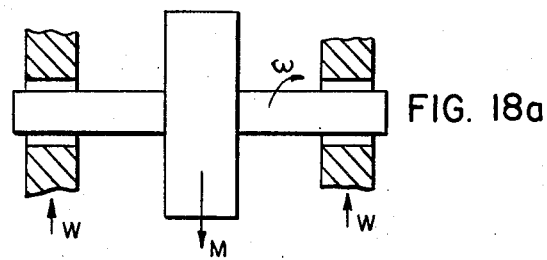
FIG. 18a is a diagrammatic illustration of factors utilized in FIG. 18.
Figure 18:
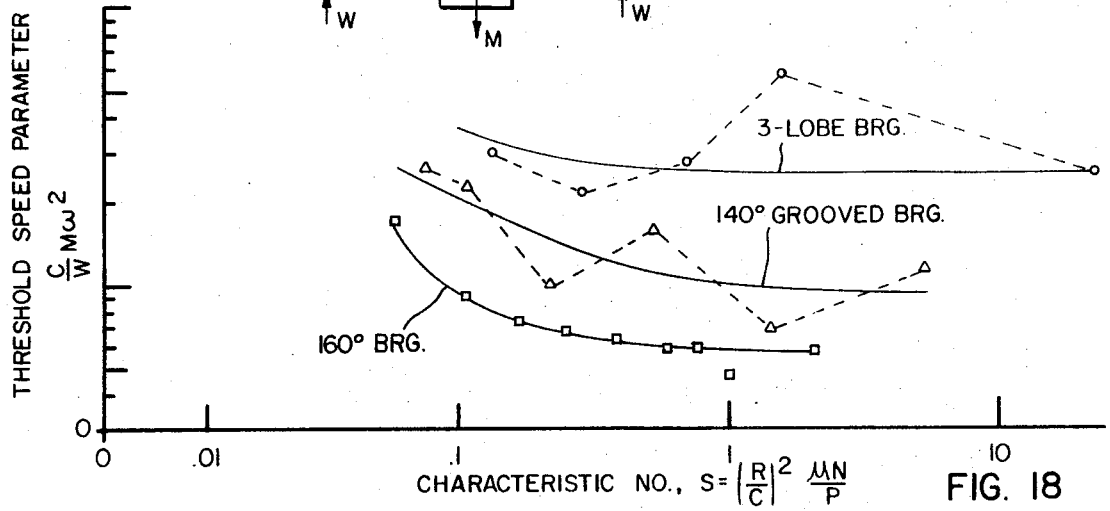
FIG. 18 is a view comparing the threshold stability curves of three different journal bearings.

FIG. 18 compares the threshold stability curves of three different bearings. These curves are plotted from data based on experiments made with laboratory test apparatus. The curves are especially significant for rating or comparing bearings rather than giving absolute data.

Figure 17:
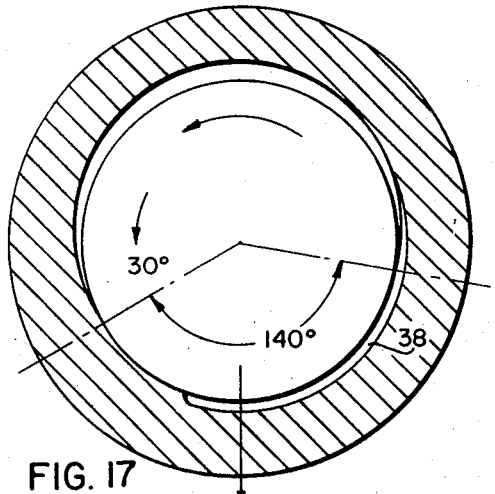
FIG. 17 is a view, in section, taken along the line XVII—XVII in FIG. 16.
Figure 16:
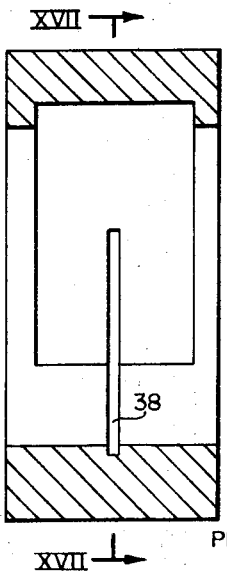
FIG. 16 is a view, in axial vertical section, of a bearing constructed in accordance with the prior art.

In FIG. 18 the 160° bearing (prior art bearing illustrated in FIG. 1) should be considered as a reference, or datum bearing. The 140° bearing, with partial circumferential groove 38 as shown in FIGS. 16 and 17, is also a prior art being which is utilized in applications where the 160° bearing becomes unstable. This bearing has been effective in eliminating or mitigating oil whip instability problems, and in this sense, this bearing is outstanding. However, it operates with a severely reduced oil film thickness (discussed hereinafter) resulting in excessively hot babbitt temperatures, especially in applications requiring large diameter bearings.

Figure 19A:
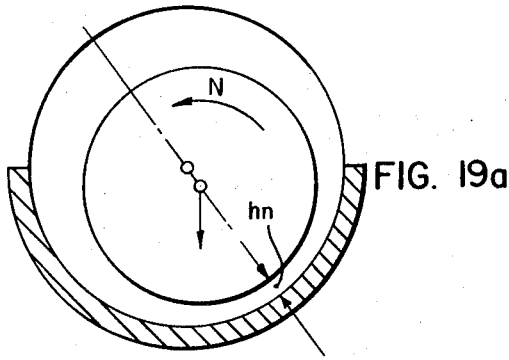
FIG. 19a is a diagrammatic illustration of factors utilized in FIG. 19.
Figure 19:
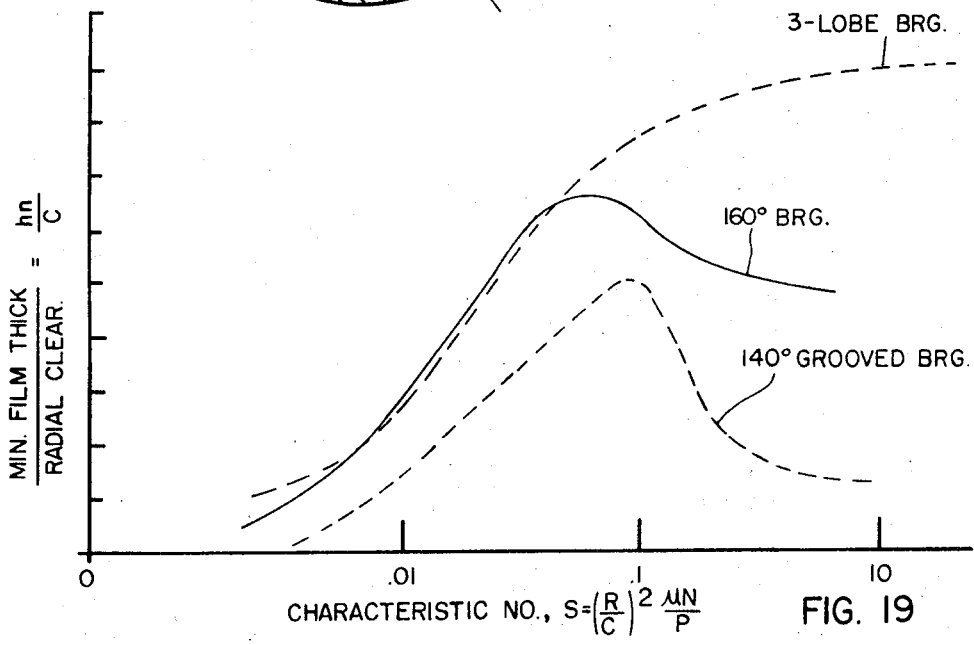
FIG. 19 is a view comparing curves for the same three bearings represented in FIG. 18 on the basis of minimum oil film thickness.

The terms shown in FIGS. 18 and 19 are explained below:

$C$ = radial clearance, in.
$W$ = bearing load, lbs.
$M$ = rotor mass, lb. sec.$^2$/in.
$\omega$ (omega) = rotational frequency, radians/sec.
$R$ = bearing radius, in.
$L$ = axial length of bearing, in.
$\mu$ (mu) = oil viscosity, lb. sec/in$^2$
$N = \omega/2\pi$
$P = W/2RL$ = unit load, psi.
$S = (R)^2/C\,(\mu N)/P$ = bearing characteristic number.
$h_n$ = minimum oil film thickness, in.

FIG. 18 shows that the stability curve for the three-lobe bearing (FIG. 2) lies above even that of the 140° bearing, with a partial circumferential groove.

FIG. 19, which is a graphical representation of the results of experimental data obtained on the test equipment hereinbefore mentioned, compares the same three bearings on the basis of minimum oil film thickness. The 140° bearing, in the practical operating range of the bearing characteristic number $S$ ($S \approx 0.1$) operates with reduced film thickness which in practice reflects as a high babbitt temperature. Compared with the standard 160° bearing it is inferior. On the other hand, it can be seen from the curves in FIG. 19 that the three-lobe bearing is equal in performance to the 160° bearing over the range of $S$ of practical interest. In fact, in the heavily loaded range (low $S$) it is superior to the standard 160° bearing. It is also superior in the lightly loaded range, high values of $S$.

The test results graphically represented in FIGS. 18 and 19 establish that the three-lobe bearing possesses improved stability characteristics (see FIG. 18) without sacrificing the other important performance characteristic—film thickness (see FIG. 19). Indeed, in heavily loaded bearing applications (where stability is usually not a problem) the selection of a three-lobe bearing over all other configurations can be justified on the basis of film-thickness alone.

From the foregoing description it is apparent that the invention provides a journal bearing which is capable of improving the performance of heavy apparatus, particularly but not necessarily restricted to, turbines and generators. The following advantages have been verified:

1. It has improved stability characteristics, compared to prior art bearings.

2. It has substantial load capacity as evidenced by a large minimum oil film thickness. In heavily loaded applications, it is superior in this respect to conventional bearings.
3. It is readily adaptable to the utilization of grooves for hydrostatic oil lift to facilitate starting, and other similar modifications such as grooves for altering oil flow.

I claim:

1. A journal bearing structure for supporting a rotatable shaft, comprising:
    a bearing member having at least three lobes each of which has a circumferentially extending arcuately tapered recess having a deepest part in the inner surface of the bearing member,
    the inner surface of the bearing member having axially extending grooves therein constituting demarcations between said lobes,
    the deepest part of the recessed portion of each lobe communicating with the adjacent groove at the leading edge of the lobe with respect to the direction of rotation of the shaft,
    and one of the lobes extending through an arc of substantially 180°.

2. The journal bearing defined in claim 1, wherein each one of the other lobes extends through an arc of substantially 90°.

3. The journal bearing defined in claim 1, wherein the bearing member is divided into a top portion and a bottom portion and said one lobe is generally at the bottom of the bearing.

4. The journal bearing defined in claim 3, wherein the lobe at the bottom of the bearing is provided with circumferentially extending grooves.

5. The journal bearing defined in claim 3, wherein the recess in each lobe is in the top portion of the bearing and is divided axially by a circumferentially extending groove.

6. The journal bearing defined in claim 3, including means for supplying oil at a relatively high pressure to the inner surface of the lobe at the bottom of the bearing.

7. A journal bearing structure for supporting a rotatable shaft, comprising:
    a bearing member having a plurality of lobes each of which has a circumferentially extending arcuately tapered recess having a deepest part in the inner surface of the bearing member,
    the inner surface of the bearing member having axially extending grooves therein constituting demarcations between said lobes,
    the deepest part of the recessed portion of each lobe communicating with the adjacent groove at the leading edge of the lobe with respect to the direction of rotation of the shaft,
    the length of said axial grooves being less than the axial length of the bearing, and
    said bearing having bleed grooves of a reduced size therein at the ends of said axial grooves.

8. A journal bearing structure for supporting a rotatable shaft, comprising:
    a bearing member having two lobes each of which extends through an arc of substantially 180° and has a circumferentially extending arcuately tapered recess having a deepest part in the inner surface of the bearing member,
    the inner surface of the bearing member having axially extending grooves therein constituting demarcations between said lobes, and
    the deepest part of the recessed portion of each lobe communicating with the adjacent groove at the leading edge of the lobe with respect to the direction of rotation of the shaft.

9. A journal bearing structure for supporting a rotatable shaft, comprising:
    at least three lobes disposed around the shaft and one of said lobes extending through an arc of substantially 180°,
    each lobe having a circumferentially extending arcuately tapered recess with a deepest part in the inner surface of the lobe, and
    the deepest part of the recessed portion of each lobe being at the leading edge of the lobe with respect to the direction of rotation of the shaft.

* * * * *